Aug. 24, 1937. W. J. OOTHOUT 2,090,765
SHUTTLE TENSION
Filed Nov. 17, 1936 2 Sheets-Sheet 2
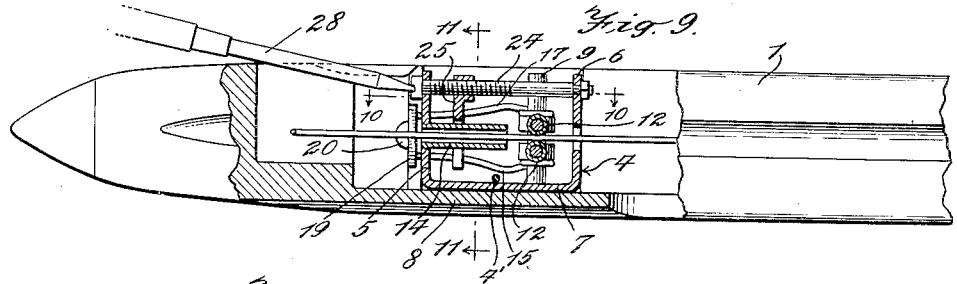
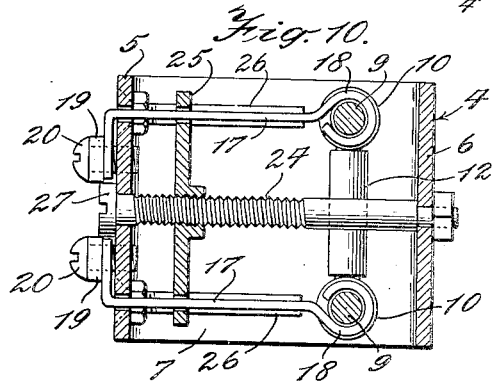
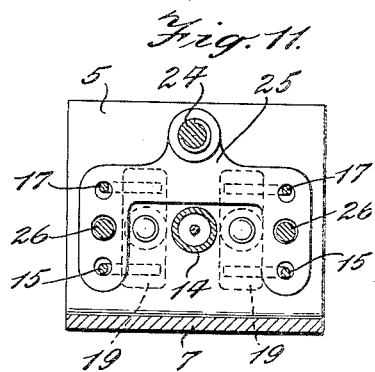
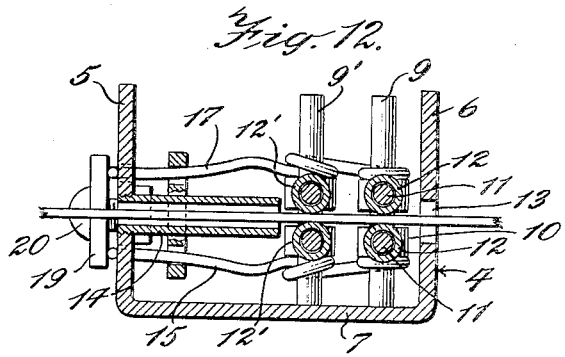
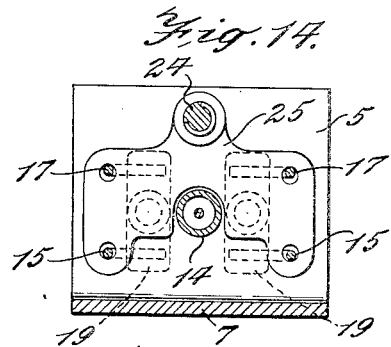
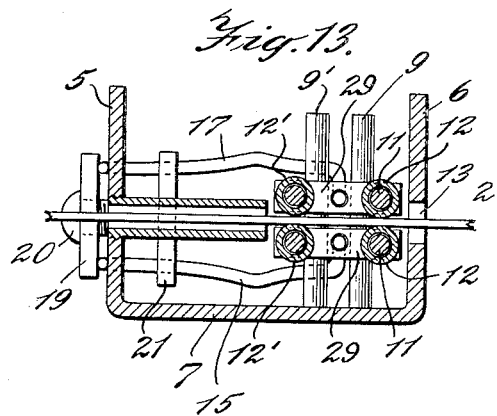
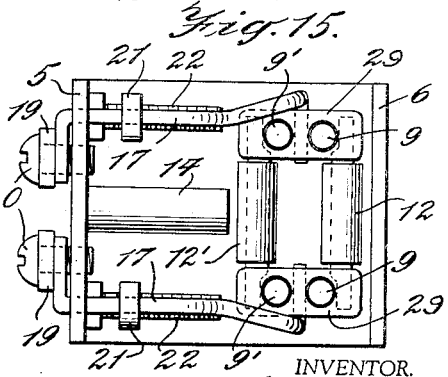
INVENTOR.
William J. Oothout
BY
Gifford Scull & Burgess
ATTORNEYS.

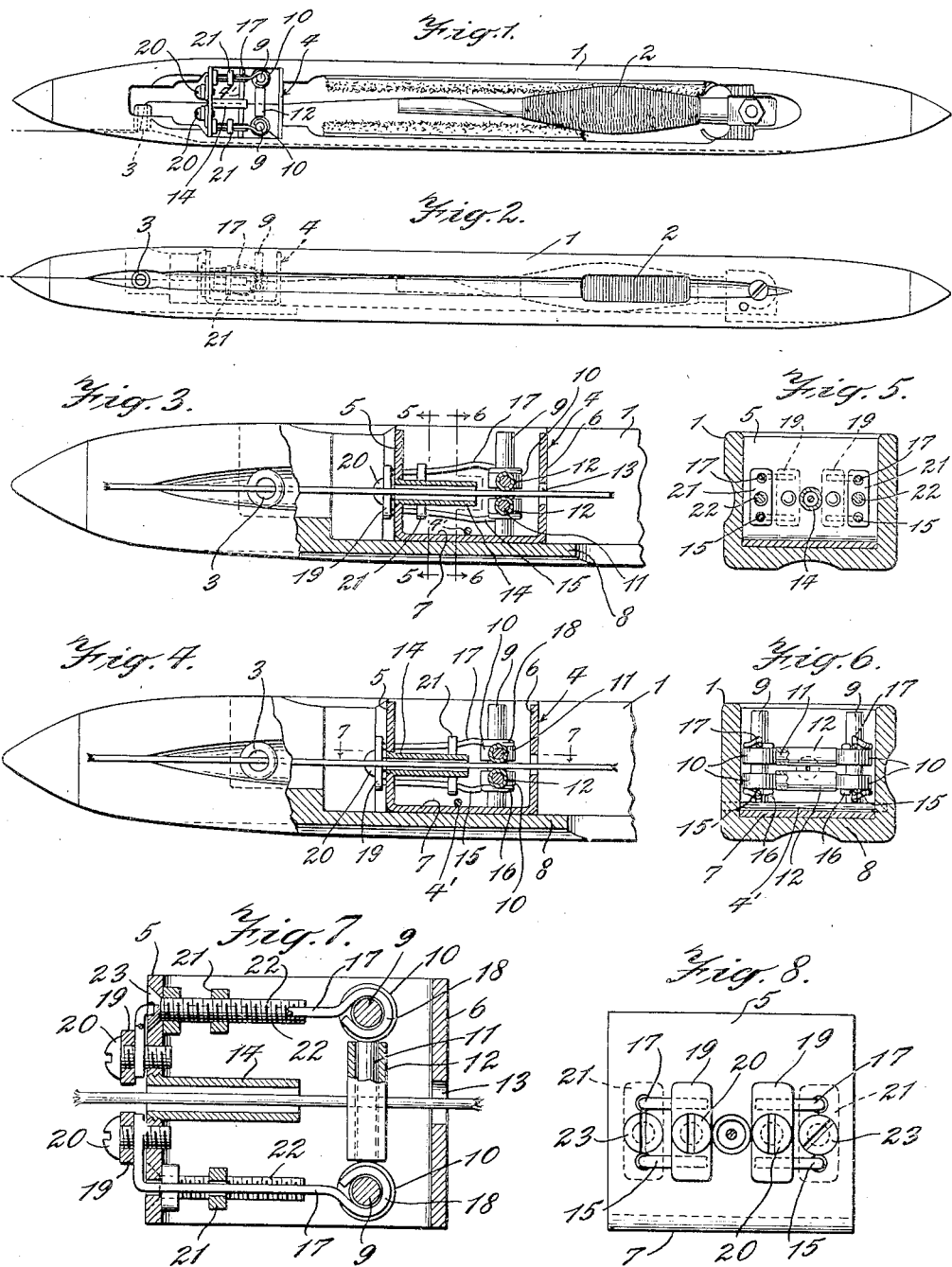
Aug. 24, 1937. W. J. OOTHOUT 2,090,765
SHUTTLE TENSION
Filed Nov. 17, 1936 2 Sheets-Sheet 1
William J. Oothout INVENTOR.
BY Gifford, Scull & Burgess ATTORNEYS.

Patented Aug. 24, 1937

2,090,765

UNITED STATES PATENT OFFICE 2,090,765

SHUTTLE TENSION

William J. Oothout, Queens Village, N. Y.

Application November 17, 1936, Serial No. 111,232

5 Claims. (Cl. 139—216)

This invention relates to a novel and improved form of shuttle tension, the novel features of which will be best understood from the following description and the annexed drawings, in which I have shown a selected embodiment of the invention and in which:

Fig. 1 is a plan view of a shuttle having one form of the invention applied thereto;

Fig. 2 is a vertical view of the shuttle appearing in Fig. 1;

Fig. 3 is a view on an enlarged scale showing one end of the shuttle, with parts broken away and other parts shown in section;

Fig. 4 is a view showing the same parts as in Fig. 3, with some of those parts in different positions;

Fig. 5 is a section on the line 5—5 of Fig. 3;

Fig. 6 is a section on the line 6—6 of Fig. 3;

Fig. 7 is a section on an enlarged scale approximately on the line 7—7 of Fig. 4;

Fig. 8 is a view of the structure appearing in Fig. 7 as seen from the left of that figure;

Fig. 9 is a view corresponding to Fig. 3 but showing a different embodiment of the invention;

Fig. 10 is a section on an enlarged scale approximately on the line 10—10 of Fig. 9;

Fig. 11 is a section approximately on the line 11—11 of Fig. 9 and likewise being on an enlarged scale;

Figs. 12 and 13 are views corresponding to Fig. 10 but showing different embodiments of the invention;

Fig. 14 is a view similar to Fig. 11 but showing the embodiment appearing in Fig. 12;

Fig. 15 is a plan view of the structure appearing in Fig. 13.

The shuttle with which my device is employed may be of any usual form, such as that indicated at 1, and which comprises a source of supply of thread, which in this instance may be a cop 2 from which thread is led through a guide 3 out of the shuttle, in this instance the guide being an eye in the side wall of the shuttle. Between the source and the guide is disposed the tension device forming the subject matter of this application.

Referring first to Figs. 1 to 8, inclusive, my tension device may comprise a frame 4, here shown in the form of a U-shaped piece of sheet metal having two vertically disposed walls 5 and 6 and a bottom 7 lying on the bottom 8 of the shuttle. The frame may have a sliding fit in the shuttle and be removably held in place by any suitable means exemplified by a removable pin 4'.

Between the walls 5 and 6, the frame carries a pair of vertical guides, here shown in the form of posts 9 upon which are slidably mounted ears 10 carrying the shafts 11 of a pair of rollers 12.

Thread from the cop may pass through a hole 13 in the wall 6 and thence between the two rollers 12 and through a tube 14 inserted in a hole in the wall 5 which is in line with the hole 13. This tube serves to guide the thread and to keep it out of engagement with other parts of the tension device.

The lowermost roller 12 is supported upon two springs 15 having their ends formed in loops 16 disposed beneath the ears 10 supporting the lowermost roller. The springs 15 may be formed of wire and of sufficient stiffness to yieldably support the lowermost roller, and similar springs 17 having loops 18 at the ends thereof may be used to bear down against the ears 10 which carry the shaft for the upper roller. Thus it will be seen that the two rollers float upon the springs 15 and 17.

The springs may have their opposite ends carried through the wall 5 in the manner best shown in Figs. 7 and 8 and held in place beneath the plates 19 secured to the outer surface of the wall 5 as by screws 20. The forces exerted by the springs may be adjusted or varied by means of travelers 21, each of which has two holes through which pass two springs 15 and 17, respectively. These travelers may be provided with threaded openings to receive screws 22 swiveled in the wall 5 but having heads 23 by which they may be turned. Such turning will effect the simultaneous variation in pressure exerted by a pair of springs 15 and 17.

In operation, thread will be led from the cop 2 through the tension device, in the manner indicated, and out through the guide 3. The frame may be removed from the shuttle, and by turning the screws 22 the proper tension may be supplied to the rollers, after which the frame may be slid back into place in the shuttle. This arrangement has several advantages, most of which will be obvious to those skilled in the art. Among these advantages is the fact that when a lump of any kind on the thread passes through the tension device, the rollers may give freely without changing the tension exerted thereby. I have found that this type of tension device is particularly good when weaving with tinsels, because it avoids the necessity of bending the thread as is necessary with most forms of tension device hitherto employed. Such bending of the thread is apt to result in a permanent bend or kink or in causing a roughness in the thread.

Referring now to Figs. 9, 10, and 11, I have shown therein a different embodiment of the invention. In this case, however, the frame 4 may conveniently be left in the shuttle if desired, a single adjusting screw 24 being provided, this screw being swiveled in the walls 5 and 6 of the frame and having a traveler 25 threaded thereon. This traveler, as best shown in Fig. 11, is guided in its longitudinal movement by guide rods 26 and engages all four springs 15—17. The screw 24 is preferably located adjacent the top surface of the shuttle so that its head 27 may conveniently be engaged by a screw driver or other suitable tool 28, as shown in Fig. 9, without removing the device from the shuttle. Otherwise, this embodiment follows closely the embodiment previously described, and a further detail description is deemed unnecessary.

Referring now to Figs. 12 and 14, I have shown a different embodiment of the invention in which I employ a pair of rollers 12' vertically movably mounted upon guide rods 9' and which are actuated by springs 15 and 17 simultaneously with the rollers 12. In this embodiment, the adjustment means is shown as comprising a traveler 25, as in the embodiment of Figs. 9, 10, and 11.

In Figs. 13 and 15 I have shown the rollers 12' and 12 supported in frames 29 which are slidable on the guide posts 9 and 9'. Otherwise, this structure follows closely what is shown in Figs. 12 and 14, and a further detailed description is not deemed necessary.

While I have shown the invention as embodied in a specific form, it is to be understood that various changes in details may be made without departing from the scope of the invention, as defined by the appended claims.

I claim:

1. A shuttle tension device comprising a pair of rollers between which thread from the cop of the shuttle may pass, a spring acting upon each roller to urge it towards the other roller, whereby either roller may move away from the other against the action of a spring, and means to simultaneously vary the force exerted by said springs, while at the same time the rollers are held by the guides against movement lengthwise of the thread.

2. In a shuttle having a source of supply of thread and a guide through which said thread passes as it leaves the shuttle, a tension device disposed between said source and said guide and comprising a frame removably supported in the shuttle, two rollers slidably mounted on said frame in position for thread to pass therebetween, spring means mounted on the frame and urging said rollers towards each other, and adjustment means also mounted on the frame and adapted to vary the pressure exerted by said spring means.

3. In a shuttle having a source of supply of thread and a guide through which said thread passes as it leaves the shuttle, a tension device disposed between said source and said guide and comprising two horizontally disposed rollers, vertical guides upon which said rollers may move vertically, a spring yieldingly supporting the lower roller, and a second spring urging the upper roller against the lower roller.

4. In a shuttle having a source of supply of thread and a guide through which said thread passes as it leaves the shuttle, a tension device disposed between said source and said guide and comprising two horizontally disposed rollers, vertical guides upon which said rollers may move vertically, a spring yieldingly supporting the lower roller, a second spring urging the upper roller against the lower roller, and means for simultaneously varying the pressures exerted by said springs.

5. In a shuttle having a source of supply of thread and a guide through which said thread passes as it leaves the shuttle, a tension device disposed between said source and said guide and comprising two parallel rollers, at least two spring wires extending lengthwise of the shuttle and each fixed at one end and having the other end arranged to force one roller towards the other, said wires extending away from each other as they approach the rollers, a traveler movable lengthwise of the shuttle and engaging said wires, and means to move said traveler.

WILLIAM J. OOTHOUT.

CERTIFICATE OF CORRECTION.

Patent No. 2,090,765.                               August 24, 1937.

WILLIAM J. OOTHOUT.

It is hereby certified that error appears in the printed specification of the above numbered patent requiring correction as follows: Page 2, second column, lines 1, 2 and 3, claim 1, strike out the comma and words ", while at the same time the rollers are held by the guides against movement lengthwise of the thread" and insert the same after "thereby" and before the period, page 1, second column, line 50; and that the said Letters Patent should be read with these corrections therein that the same may conform to the record of the case in the Patent Office.

Signed and sealed this 19th day of October, A. D. 1937.

(Seal)

Henry Van Arsdale
Acting Commissioner of Patents.